United States Patent Office 3,365,395
Patented Jan. 23, 1968

3,365,395
PROCESS FOR TREATING SEWAGE WITH A HALOGENATED HYDROCARBON SOLVENT
Dan McDonald, St. Louis, Mo., assignor, by mesne assignments, to Science Progress, Inc., St. Louis, Mo., a corporation of Missouri
Continuation-in-part of application Ser. No. 165,432, Jan. 10, 1962. This application June 22, 1964, Ser. No. 379,764
14 Claims. (Cl. 210—21)

This application is a continuation-in-part of my prior copending application Ser. No. 165,432, filed Jan. 10, 1962, now abandoned.

This invention relates to the treatment of waste products, and particularly to the solvent treatment of sewage and waste material.

There has long been a problem in community living with respect to an economical method of treating waste materials and sewage without contaminating our rivers and streams, endangering public health and without being a tremendous financial burden on the community. There have been many time consuming methods of treating the waste materials which accumulate naturally in community life. The majority of these methods are inefficient first, from the standpoint of decontaminating the waste material, and secondly, from the standpoint of treatment time of the waste material, and in the recovery of valuable trace minerals and fertilizers present in human fecal matter and garbage waste materials.

The present invention is an improvement of the method disclosed in my U.S. Patent No. 2,755,293, wherein it is taught that the sewage sludge from the primary settling tanks, or raw sewage, is stratified by centrifugal action, without chemical treatment or coagulation, so as to separate it into strata of organic solids, water, and fats, without chemical aid or chemical coagulation means, with the stratum of water between the stratum of organic solids and fats, and the outer face of the stratum of organic solids is continuously washed with a solvent having a greater specific gravity than the organic solids, and maintained thereby out of contact with the stratum of water. The solvent and solids entrained thereby are continuously discharged, and the effluent water from the water stratum is continuously discharged separately from the discharge of the solvent which is thereby maintained out of contact with the water throughout the operation. It has been found, however, that the centrifugal action at this particular time did not accomplish the objectives originally desired. The results showed that there was inefficient stratification due primarily to the fact that a majority of the fat material was solvent soluble and was not being sufficiently removed from the sludge.

The raw sewage often contains as much as 25 percent fats, oils and greases, with the average about 15 percent, which have commercial value and have heretofore not been recovered. Normally these materials are still present in the dried materials resulting from the sewage treatment plants and is burned, buried or allowed to pass into our rivers and streams.

Also there is present a relatively large amount of sand, some of which if not removed from the operation in the early stages thereof, will clog the apparatus and destroy the efficiency thereof. In each 1,000 cubic feet of raw sewage, there is present about 2 cubic feet of sand. This concentration may vary decisively in different areas depending upon the amount of garbage, whether the waste is commercial or industrial, and the geographical locations. The sand having a specific gravity of about 2.6 would continue through the centrifuge step (of the method of Patent No. 2,755,293) in the same phase with the solvent and proceed to the dehydrator and either clog that apparatus or pass with the meal forming an objectionable ingredient therein. With an average daily pumpage of 10,000 cubic feet of sewage there would be present about 3,320 pounds of sand. Such a large amount of sand is detrimental to the apparatus used in the process as well as being an objectionable ingredient in the meal recovered from the process.

It is therefore an object of the present invention to provide an efficient method of treating waste materials.

Another object is to provide a method of treating waste materials at minimal cost while simultaneously recovering useful fats and oils, inorganic materials and trace minerals and sterile organic materials useful as fertilizers.

Another object is to provide a method of treating waste materials, the residue of which will not contaminate rivers or streams or endanger public health.

Other objects will become apparent to those skilled in the art from the following detailed disclosure which is set forth in such full, clear and exact terms that it will enable those skilled in the art to make and use the same when taken with the attached drawings, which forms a part of the detailed description, and in which:

FIGURE 1 constitutes a diagrammatic view with parts broken away of a flow sheet, suitable to practice the present invention;

Figure 1:
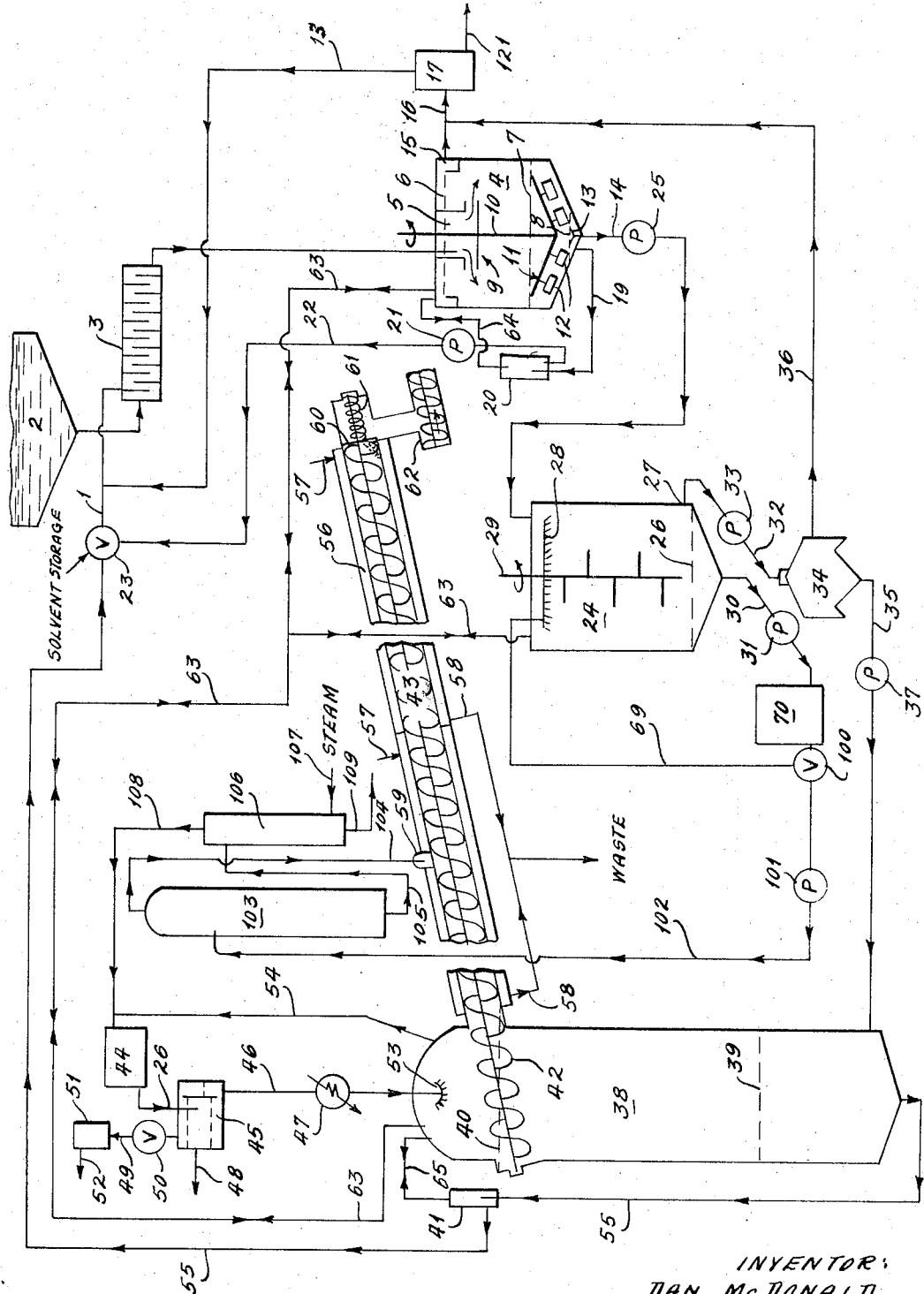

Prior to more particularly describing the invention, certain terminology, which will be extensively used throughout the following description and claims, must first be defined.

"Sewage" is meant to include all commercial and/or industrial waste material, human fecal matter, garbage and the like.

"Sludge" as used herein should be construed as referring to a mixture of comminuted sewage material and solvent.

The term "solvent" is meant to include halogenated hydrocarbon solvents of which the following class of solvents is represented, but not exclusive: Perchloroethylene (tetrachlorethylene), trichlorethylene, tetrachlorethane, chloroform and carbon tetrachloride. The preferred solvent, however, is perchlorethylene, which has a boiling point of 250° F., an azeotropic boiling point with water of between about 190 and 195° F., and a specific gravity of 1.62. The solvent in the present method serves a dual purpose in that it not only dissolves the solvent solubles (fats and the like), but also serves as an effective dehydrant. In the following disclosure, as a specific exemplification of the present invention, perchlorethylene should be used as the solvent, but any of the above solvents are equally applicable. The temperatures set forth in the following disclosures are based on perchlorethylene as the solvent, and it is obvious that when a different solvent is used, the temperature will have to be adjusted correspondingly.

"Meal" as used in the specification and appended claims refers to the organic material that is the ultimate desired product of the process. This meal has value as a sterile fertilizer that will release its organic ingredients, as well as trace minerals, to the soil with great ease without the odoriferous characteristic exhibited by present organic fertilizers. The meal is also useable as a source of vitamin B–12 and may be used as a supplement to farm animal feeds.

In the present invention, as stated above, it is the objective to so treat sewage that all products or by-products will be free of contaminating properties while simultaneously providing a self-sustaining sewage treatment. When the end product is intended to be a dry sterile fertilizer, the sewage is preferably ground in the presence of an excess of solvent so as to comminute the larger particles of sewage material. The resulting comminuted material (sludge) is allowed to settle for a predetermined period of time (relatively short, i.e., about 15 to 60 minutes, or shorter). Due to the presence of the solvent, the sludge will settle rather rapidly and separate itself from a majority of the effluent water present. The effluent water is continuously removed and further treated, in numerous ways, to be thoroughly decontaminated and then discarded. The sludge, meanwhile, will also be continually removed and passed to a surge tank where it is further exposed to solvent, thereby allowing the solvent to thoroughly remove from the sludge, all solvent soluble materials. There will be formed in the surge tank two major layers, the lower or heavier layer containing the heavier materials like solvent and heavy inorganic material, while the light layer will contain sludge, solvent containing solvent soluble material and entrained effluent which is still present from the preceding step. The lower or heavier layer will be withdrawn and passed through suitable apparatus to separate the inorganic material from the solvent. The lighter layer will be passed through a centrifuge which will remove therefrom any remaining effluent and the residual solvent and sludge will then pass to the extraction chamber. The sludge will separate into meal and solvent, and the meal having a specific gravity less than the solvent will float on the surface thereof and be continuously removed and dried and readied for consumer use.

The solvent is also continually removed from the extraction chamber and recycled back through the grinder to repeat the cycle.

The sewage treatment process described herein requires much less time and is more efficient than any present-day process. For example, in ordinary sewage treatment, about 720 hours are required to complete one cycle while in the present process only 1 hour is required.

For the sake of convenience and clarity, the invention will be broken down into three major categories, namely, sludge treatment, sand removal and effluent treatment.

SLUDGE TREATMENT

The sewage is introduced into grinder 3 from sewage disposal 2 and there brought into contact with the solvent introduced via line 1. By contacting the sewage with the solvent at this early stage, and grinding the sewage in the presence of the solvent, the fats, oils, greases and other solvent solubles are more readily dissolved than would be the case as described in my Patent 2,755,293. As an added advantage, attributable to the early solution of the solvent solubles, the sludge (comminuted sewage and solvent) when passing from the grinder 3 to the settling tank 4 (primary settling tank), will more readily stratify into about three distinct layers. The uppermost layer, having the lowest specific gravity, and comprising primarily effluent water and water soluble materials, the upper surface of which is shown at 6, will pass from settling tank 4 to secondary treatments (described more fully in connection with FIGURE 4). The middle layer, sludge layer (between interface of effluent and sludge 7, and interface of sludge and solvent, 8) will be pumped from settling tank 4 to sludge surge tank 24, and the bottom layer is comprised primarily of solvent which can be continuously extracted and returned to the grinder 3 for further use.

The center layer or sludge layer will contain the solvent with dissolved solvent solubles, such as the fats, oils, greases, and the like, as well as, solvent insolubles, such as wet ground sewage and other entrained solids. These materials pass together to sludge surge tank 24 for further separation and treatment as hereinafter more fully set forth.

The sludge contains valuable trace minerals, and if it is desired to recover these from the sludge, it should be done at this stage in the process. However, it is believed that the meal ultimately recovered will be more valuable as a fertilizer and feed if these trace minerals are not removed. Conventional means of removal of these minerals can be used and this does not form a part of the present invention.

When the sludge from the grinder 3 enters primary settling tank 4, it enters through the deep well section 5, below the surface of the effluent water layer, and is evenly distributed throughout the tank by means of baffle 9. There is present in the settling tank 4 an agitator system driven by agitator shaft 10 at a low r.p.m. rate—just sufficient to keep the sludge in motion but insufficient to keep it from uniformly settling on the surface of the thin layer of solvent. In the absence of such distribution, channeling and clumpy settling would be prevalent. At the lower end of the shaft 10 is a brace 11 onto which are attached paddles 12 to keep the settled material moving toward the sludge exit 13 and out of the settling chamber into line 14. The sludge exit 13 is located at the interface 8 between the solvent and the sludge.

The effluent water and water soluble materials are continuously withdrawn from settling tank 4 through overflow 15 and passed to effluent treatment 17 via line 16, where any entrained solvent is flashed off and returned to line 1 via 18. The solvent free effluent is then sterile and may be disposed of in any desired manner without deleterious effects to rivers, streams or the like. The treatment of this effluent will more fully be discussed later with reference to FIGURE 4.

Solvent, which is present in excess in the grinder and passes to the settling tank 4, is withdrawn from the settling tank via line 19 and passes into the adjustable solvent leg 20. The solvent leg is adjustable so as to enable the operator to maintain the solvent level in settling tank 4 at the height shown at 8, equal to or slightly above the sludge exit 13. Since solvent is continually being withdrawn from settling tank 4, pump 21 moves the solvent via line 22 and 4-way valve 23 to line 1 to be re-used in the grinder 3.

Sludge and solvent are pumped to surge tank 24 via line 14 and pump 25 which serves as a temporary storage chamber for the sludge. In the sludge surge tank 24, there will be formed two distinct layers separated as an interface shown as 26. The uppermost layer containing primarily sludge and solvent and the lower layer comprising primarily heavy inorganic materials and excess solvent (with a specific gravity higher than that present in the upper layer). The upper layer (sludge, etc.) is continually withdrawn at 27 and pumped by pump 33 to a centrifuge 34 via line 32. Part of the solvent removed from 24 will pass through sand traps 70 and re-enter surge tank 24 via line 69 as a spray through sprayer 28 located in the top of the tank. The recycling of part of the solvent in this manner will help to more fully dissolve the solvent soluble material that may be present in the sludge, even after the previous treatment. Surge tank 24 is equipped with a stirrer 29 which enables the solvent to be intimately mixed with the sludge and to come in contact with and dissolve any solvent soluble material present. The stirrer also aids the heavy inorganic materials and excess solvent to separate from the sludge.

Figure 2:
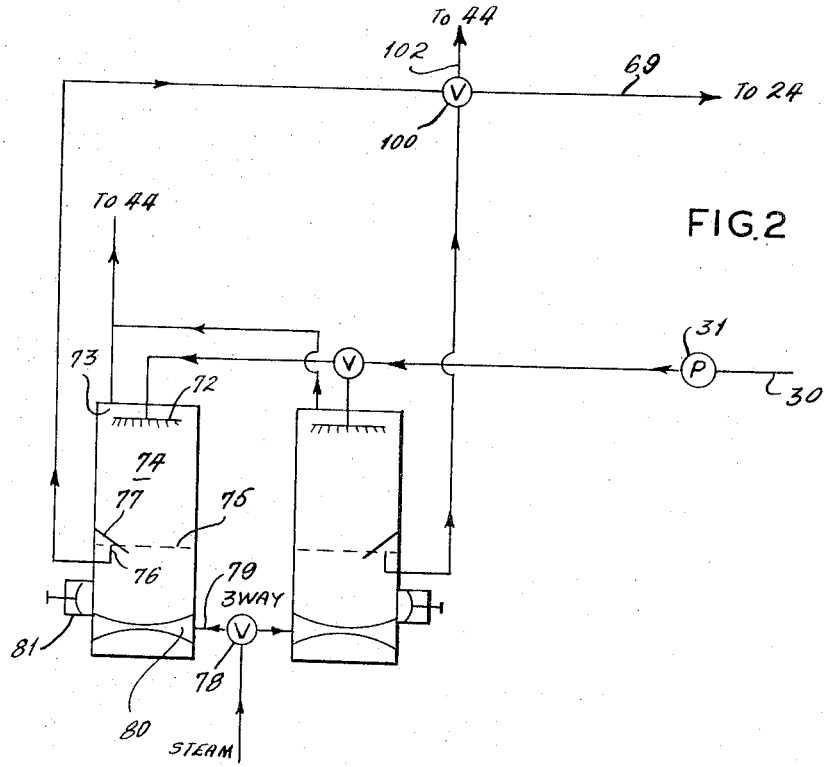
FIGURE 2 is a diagrammatic view of a sand removal unit used in the flow sheet of FIGURE 1.
Figure 3:
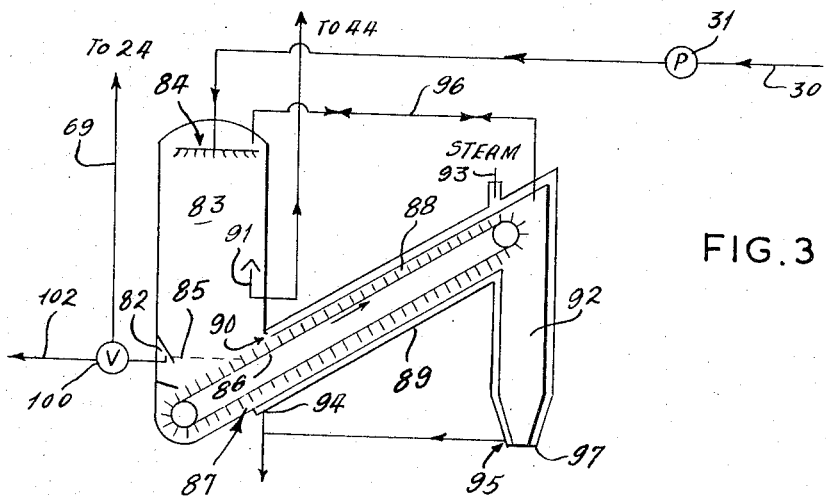
FIGURE 3 is a diagrammatic view of an alternative sand removal unit.

The excess solvent, and heavy inorganic materials are continuously pumped (via line 30 and pump 31) to the sand trap 70, as will more fully be described in the discussion of FIGURES 2 and 3.

The sludge and solvent from 24 is pumped by metering pump 33 via line 32 into centrifuge 34 where a majority of the remaining effluent, entrained by the sludge, is removed. In passing the sludge, solvent and effluent into the centrifuge, there will be formed therein a layer of solvent through which the materials will have to pass. The effluent, having a lower specific gravity than the other materials, will be readily separated from the sludge and solvent. The latter materials will pass together from the centrifuge via line 35, while the effluent is removed therefrom via line 36. The effluent from the centrifuge will be mixed with the effluent from the settling tank and treated as hereinafter described.

The sludge and solvent is discharged from the centrifuge 34 via 35 and pumped to the extraction chamber 38 by pump 37 where the fat-free sludge will float on the solvent when quiescent; the sludge should fill about two-thirds of the chamber 38 and rise to a level as indicated by 40 (39 representing the interface between the sludge and solvent). The level of the fat-free sludge, which is readily adjustable by changing the position of the adjustable solvent leg 41 (as described earlier for solvent leg 20), must be such that the screw conveyor 42 will continuously remove the surface layer of the fat-free sludge from the extraction chamber into the dryer 43.

Prior to a thorough discussion of what takes place within the extraction chamber itself, it should be pointed out that the herein presented process is a closed system process. Therefore, it is necessary to have within the system, such apparatus that will separate the solvent soluble material from the solvent, as well as, means to separate water from solvent (formed by the condensation of the azeotropic mixture of solvent and water) and the like. Also, it must be pointed out that there is present within the entire system an excess of the solvent. At some points of the process, and particularly hereinafter in the discussion, the solvent will form an azeotrope with water that is present in the system. The azeotropic mixture, using perchlorethylene as the solvent, will contain 5.3 parts perchlorethylene to every 1 part water. Thus, it is for this reason, as well as those previously stated, that there must always be an excess of the solvent present in the system. The azeotrope (water/perchlorethylene) has a boiling point of between about 190° and 195° F. which is considerably less than the boiling points of water (212° F.) or perchlorethylene (250° F.) and thus, this azeotrope affords a convenient economical method of dehydrating the sludge, especially in the extraction chamber and dryer.

Steam is often used in the system as an economical source of heat and when it is allowed to come in contact with perchlorethylene, the azeotrope will be formed. The azeotropes formed throughout the entire system are passed to condenser 44 where the azeotrope is condensed and passes into water separator 45. The solvent separated in the water separator is pumped via line 46 through heater 47 where it is heated to a temperature of between about 190° and 240° F., and then is sprayed onto the meal in the extraction chamber 38 as hereinafter more fully set forth. The water separated in 45 is returned to a furnace, via 48 and heated and re-used as steam (not shown). Non-condensable vapors from water separator 45 are removed via line 49 and valve 50 into carbon absorber 51 where any entrained solvent is adsorbed by the carbon, the remaining non-condensables being discarded via line 52 by a blower (not shown). The preferred carbon absorber is of the type set forth and fully described in my Patent No. 2,777,534.

The heated solvent from water separator 45 and heater 47 is sprayed through spray 53 onto the surface of the sludge. This hot solvent will serve a dual purpose, namely, form an azeotrope with any entrained water present in the sludge and dehydrate the sludge. The azeotrope formed will pass, as vapors, through line 54 to condenser 44. Besides removing any water that might be present, the hot solvent will also dissolve any solvent soluble material that might still be present in the sludge. Due to the fact that the extraction chamber is heated only by the introduction of hot solvent at 53, there will be a gradual decrease in the temperature of the sludge from the upper surface (heated by the hot solvent) to the interface 39 of the sludge and solvent, thus the solvent that is not removed from the extraction chamber as part of an azeotrope will pass through the sludge and gradually become cooler. The solvent that passes through the sludge will displace any solvent containing fat solubles and force the latter downwardly and eventually into the solvent layer which is continually withdrawn and recycled through the system via line 55 and back through valve 23 to grinder 3.

The fat free sludge (hereinafter called meal) from extraction chamber 38 is continually withdrawn by screw conveyor 42 into dryer 43 which is heated by a dual source. The dryer is surrounded by a steam jacket 56 which is fed by steam line 57. For convenience, and in order to maintain a relatively uniform temperature, the steam jacket can be divided into one or more jackets (as shown herein). The steam exits the jacket at 58. This maintains the temperature of the dryer at above about 250° F. As an additional heating source, hot solvent vapor from a still (used to separate the solvent and solvent-soluble material as more fully described later) enters the dryer 43 at 59 and forms an azeotrope with any moisture that is present in the drying meal. The dryer is sealed at the end where the meal is discharged and therefor these solvent vapors are continuously forced into chamber 38 and pass via line 54 to the condenser and water separator. The high temperature of the dryer maintains the solvent in vapor form.

As the meal continues its path through the dryer 43, it will become increasingly more dehydrated and will finally be discharged from the dryer through the sealed end thereof represented as 60. As the meal builds up in front of seal 60, the seal will be forced open, compressing spring 61 which prevents the seal from opening freely without force being applied. The seal may be of any general type known to those skilled in the art. The meal is then discharged through the seal to a meal conveyor 62 which takes the meal to storage. It is this meal which has value as a fertilizer and a source of trace minerals and a utility as a feed supplement.

The primary settling tank 4, sludge surge tank 24 and extraction chamber 38 are all interconnected by an equalizer line 63 so that excessive pressures will not build up and that the materials will move freely by the pumping means. The adjustable solvent leg 20 is also connected to the settling tank 4 by an equalizer line 64, similarly, solvent leg 41 and extraction chamber 38 are connected by an equalizer line 65.

Figure 5:
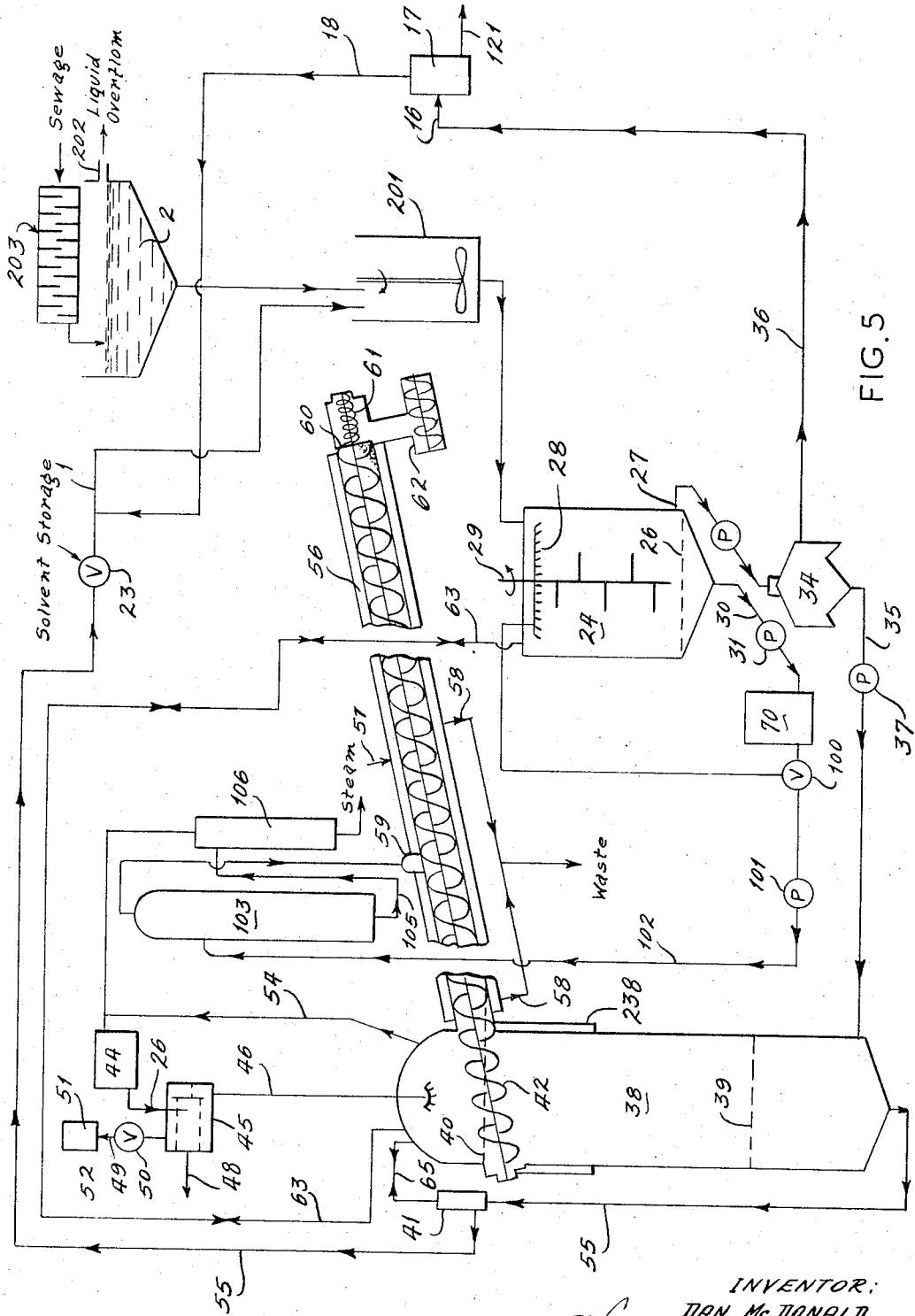
FIGURE 5 is a flow sheet like FIGURE 1, but illustrating another embodiment of the invention.

In situations where it is not feasible or desirable to dehydrate the meal, as where it can be composted or where it can be disposed of by incineration, some of the instrumentalities above described may be dispensed with. For example, to produce an end product composed of about 35% sterile solids in effluent, the system illustrated in FIGURE 1 may be modified as shown in FIGURE 5.

(A) Replace grinder 3 with a mixer 201 into which solvent line 1 leads, and relocate the grinder to a position 203 where it will comminute the solids in advance of their deposit in settling basin 2. Thus the settlings in basin 2 (which are withdrawn from the bottom thereof and delivered to the mixer) contain less water than when the sewage is deposited raw (unground) in the basin, and there is less water to be processed. The excess of water may overflow from basin 1 and be disposed of in any convenient way through pipe 202.

(B) Connect the discharge from the mixer 201 (at the position of grinder 3 shown in FIGURE 1) directly to tank 24, thereby eliminating or circumventing settling tank 4 and its appurtenances.

(C) Dispense with the introduction of hot solvent into chamber 38 with or without providing other means such as steam jacket 238 of heating the contents of chamber 38. When no other heating means is substituted, the effluent entrained sludge is continuously skimmed from the top of the charge in chamber 38, and the solvent content thereof flashed off in the steam-jacketed conveyor 43.

Modification A reduces the amount of water introduced into that part of the process where solvent is present, and thus adapts steam-jacketed conveyor 43 to eliminate the solvent and azeotropic water from the sludge and effluent traversing it. If it is desired to remove more than the azeotropic water, the heating in conveyor 43 can, of course, be increased to do so.

SAND REMOVAL

Due to the large amount of sand (and other heavy inorganic material) present in the sewage, it is necessary to remove this material from the sludge, since if not removed, it will lead to inefficiency of the apparatus, as well as yielding an inferior meal. The solvent and heavy inorganic materials (primarily sand) that were withdrawn from the sludge tank 24 via line 30 and pump 31, are pumped to a sand removal unit designated generally in FIGURE 1 as 70. FIGURES 2 and 3 are representative of two alternative means of separating the sand from the solvent and recovering both.

FIGURE 2 shows a diagrammatic illustration of a sand trap system which is applicable to systems having a relatively low pumpage of sewage or where the amount of sand recovered would be small. In this system, two tanks may be connected so that they may be alternated periodically. Thus, when one becomes full of sand and other material, it can be cleaned out without interrupting the continuous operation of the overall system. In order to conserve time and eliminate duplication, only one of the tanks as shown will be discussed. The solvent and heavy inorganic material is pumped via line 30 and pump 31 into tank 74 where it is sprayed by spray 72 which facilitates ease of stripping the sand and other materials from the solvent. There is maintained in tank 74 a solvent level as shown at 75 which allows any solvent soluble materials remaining to be dissolved completely by the solvent while the sand and other solvent insolubles sink to the bottom of tank 74. The solvent is maintained at a constant level by the overflow 76 which continually takes off the excess solvent and passes it through the valve 100. Part of this solvent is returned to settling tank 4 as described previously, while the remainder of the solvent is treated as more fully described later. The overflow 76 is protected from the unseparated and insoluble materials by baffle 77 thereby allowing only the solvent to be removed from the tank. When the tank has been sufficiently filled with sand and other materials, steam valve 78 is opened, thereby allowing steam to enter tank 74 via line 79 and pass through the sand bed 80. The steam forms an azeotrope with the solvent which exits tank 74 at 73, and continues to condenser 44. The steam is allowed to continue until all solvent has been removed and the sand has been completely dried. At or before the opening of steam valve 78 the alternate tank is put into operation. Once the solvent has been removed from the sand, the door 81 is opened and the sand removed, and the cycle is then repeated.

FIGURE 3 is a diagrammatic illustration of an alternative method of removing sand and other solvent insoluble materials on a continuous basis. This means is particularly applicable to sewage disposal units wherein a large amount of sand is present. The solvent and inorganic materials from surge tank 24 are pumped via line 30 by pump 31 and sprayed into tank 83 by spray 84; a solvent level 85 is maintained in a manner similar to that disclosed for the tank 74. Excess solvent is removed via the overflow 82 and passed through valve 100 as above described, with respect to the sand trap of FIGURE 2. At the base of tank 83, there is present a chain type conveyor system 86 having flights 87 which continuously remove the deposited sand through a dryer 88 which is jacketed by steam jacket 89. The steam enters the jacket 89 at 93 and exits at 94 and 95 (at base of hopper 92). As the conveyor 86 moves in the direction of the arrow, steam emitted from the jacket at point 90 will form an azeotrope with the solvent picked up by the conveyor, and the azeotrope will exit via 91 and pass to condenser 44. There will generally be present excess steam which will pass countercurrently with the sprayed solvent and will form an azeotrope with part of the solvent which azeotrope will also exit at 91. The pressure that builds up in each of the dryer 88 and tank 83 are equalized by line 96. The conveyor system deposits the dried sand into hopper 92, which is also jacketed by the steam jacket to prevent the sand from cooling below the dew point of azeotrope. The lower end of the hopper is sealed (at 97 but not shown) in a manner similar to that disclosed previously for the meal dryer 43. From hopper 92 the sand may be commercially used as desired.

The majority of the solvent which is taken from 70 (generally) and passed through valve 100 is pumped by pump 101 via line 102 to still 103; this solvent contains dissolved fats, oils, greases and other solvent soluble materials. The solvent is distilled off and passes down line 104 into dryer 43 where it serves as a source of heat for the dryer, as has been more fully described earlier. The separated fats, oils, greases, etc., pass via 105 into stripping tower 106 which is steam heated, via steam line 107. The steam forms an azeotrope mixture with any entrained solvent and the azeotrope passes from the stripping tower 106 to condenser 44 via line 108 where the water, solvent and other non-condensables are separated as hereinbefore described. The fats, oils and greases are taken from the stripping tower 106 at 109. These materials are useable as fuel for the furnaces which generate the steam used in the system. They are also capable of other commercial uses.

EFFLUENT TREATMENT

Although a majority of the contaminates present in sewage have been made sterile by their contact with solvent, there are still present in the effluent, certain contaminates, such as viruses, which would be detrimental to the inhabitants of rivers, streams and the like. These contaminates can be irradicated by raising the effluent to a temperature above about 187° F. The temperature of the effluent can be raised in a multitude of ways, however, in order to minimize the amount of heat required, the following method, taken with FIGURE 4, countercurrently flowing the effluent with solvent, has proved successful and economical.

The effluent, taken from the primary settling tank 4 and the centrifuge 34, is passed to the effluent treatment means (indicated generally as 17 in FIGURE 1). The effluent enters the enclosed insulated treatment trough 110 at 112. In trough 110 there are a multitude of mixers 113. The number of mixers is dependent upon the length and width of the trough, but as an approximation, it will take from one to two mixers for each 10% temperature change. The mixers serve a dual purpose, namely, they provide a means for intimately mixing the solvent and effluent so as to effect a temperature change, while simultaneously bringing the effluent into intimate contact with the solvent to further effect sterilization. At the point of mixing the temperature of the effluent will be the same as the temperature of the solvent.

Figure 4:
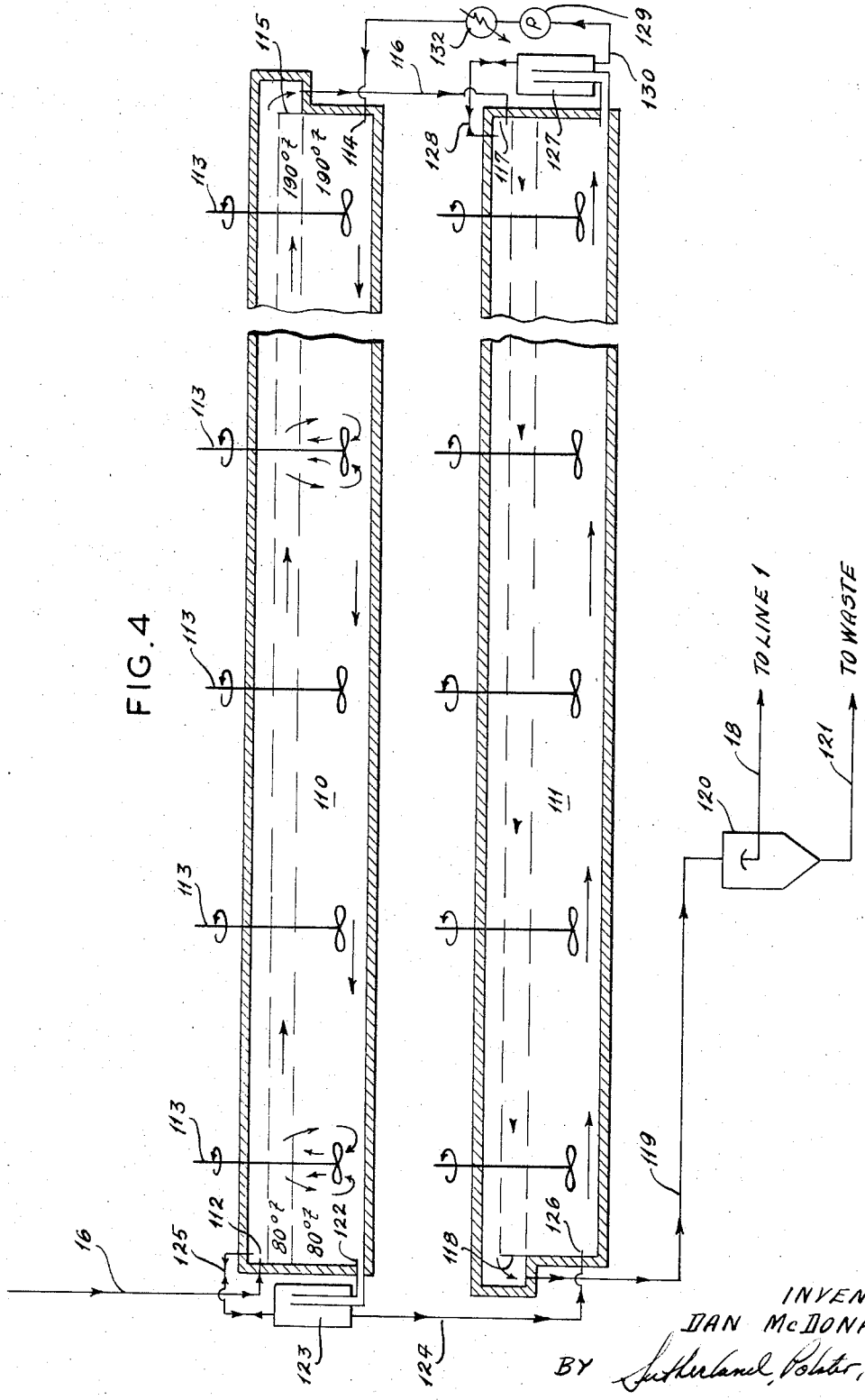
FIGURE 4 is a diagrammatic view of an effluent treating unit.

Hot solvent (about 190° F.) will enter trough 110 at point 114, at the end opposite to the effluent entrance, and will flow countercurrently to the effluent. Both fluids will continue to flow in their normal directions as the differential head of each liquid controls its flow. As the effluent, which enters the trough at about 80° F., flows from left to right in trough 110 (as seen in FIGURE 4), its temperature will be gradually raised until it reaches a temperature of about 190° F. This temperature will be reached at a point in the trough where the hot solvent enters (at 114). The effluent, now heated to about 190°

F., will overflow baffle 115 and pass via line 116 and enter trough 111 at point 117. Trough 111 is equipped with mixers in the same manner as previously described for trough 110. The heated effluent then will be gradually cooled down to about 80° F. by transferring its heat to the cool solvent returned to trough 111 from trough 110. When the effluent reaches the discharge point of trough 111, it will overflow baffle 118 and pass via line 119 to a vacuum chamber 120 where any entrained solvent will be separated from the effluent and returned to the system via line 18. The procedure which takes place within the vacuum chamber is well known to those skilled in the art and does not per se, form a part of the present invention. The effluent, now sterile can be passed to waste via line 121. This sterile effluent is rich in certain trace minerals and is excellent as irrigation water.

The solvent present in the effluent treatment system is continuously recycled from trough 110 to trough 111. The hot solvent entering trough 110 at point 114 gradually transfers its heat to the cool effluent, and is finally discharged from trough 110 at point 122 as cool solvent. The solvent passes through discharge point 122 to solvent leg 123 and from there to trough 111 via line 124. The solvent leg 123 is present so as to maintain a constant solvent level in trough 110. The solvent leg is also interconnected with the trough 110 by equalizer line 125 so as to maintain an equal pressure in both. The solvent discharged from trough 110 has a temperature of about 80° F. The cool solvent then enters trough 111 at point 126, and flows therein countercurrently to the effluent and absorbs the heat given off by the effluent, and is finally discharged from 111 into solvent leg 127. Solvent leg 127 serves the same purpose and functions in the same manner as solvent leg 123, and is equalized with trough 111 by equalizer line 128. The solvent from 127 is then pumped by pump 129 via line 130 to heater 132 and from there to trough 110 to commence a new cycle.

It may be desirable from time to time to withdraw part of the solvent and pass it through a still (such as 103 in FIGURE 1) to separate any grease or the like which might have been present in the effluent and then dissolved by the solvent. The solvent may be withdrawn at a point near pump 129 prior to commencing a new solvent cycle. Any new solvent that may be needed should be introduced to the system at a point between the trough 111 and the heater 132 (not shown in drawings).

As can be seen from FIGURE 4, the solvent and effluent are flowed countercurrently in volumes of one volume effluent to a little over three volumes of solvent. The specific heat of the solvent (perchlorethylene) is .2, while its specific gravity is 1.62. Thus, it takes about three volumes of solvent to provide one B.t.u. which will raise the temperature of one volume of water, one degree F.

Thus, the method herein described allows the recovery of materials which have economical and commercial application, as well, as providing a method of treating sewage in a manner which is economical, eliminates stream pollution and is not dangerous to public health. By allowing the recovery of these materials, the entire sewage treatment plant can be substantially self-sustaining, profitwise, and thus, will no longer be a financial burden on the community.

Many changes in and modifications of the process set forth herein may be made without materially departing from the spirit of the invention or sacrificing any of its advantages.

Having thus described the invention, what is claimed and desired to be secured by Letters Patent is:

1. In the art of converting raw sewage to a sterile fertilizer, the method comprising the steps of grinding said raw sewage in contact with a halogenated hydrocarbon solvent which has azeotropy with water to form a sludge and effluent mixture, separating the sludge from the effluent by stratification and decantation, dehydrating the sludge by heating it while in contact with the halogenated hydrocarbon solvent, and vaporizing the solvent from the dehydrated sludge.

2. The method of claim 1 wherein the solvent has a higher specific gravity than the sludge, floating the sludge on the surface of liquid state solvent, dehydrating the floating sludge by subjecting the upper surface thereof to the halogenated hydrocarbon solvent at a temperature above the azeotropic boiling point of the solvent with water, continuously skimming the sludge from said surface thereof.

3. The method of claim 1 wherein the halogenated hydrocarbon solvent is selected from the group consisting of perchlorethylene, carbon tetrachloride, trichlorethylene, tetrachlorethane and chloroform.

4. The method of claim 1 wherein the sewage contains heavy inorganic material, and said material is settled from the sludge and effluent after grinding.

5. The method of claim 1 wherein separate increments of solvent are removed from the sludge and effluent by vaporization and by stratification, and such removed solvent is distilled to recover fats, oils, greases, and the like dissolved therein.

6. In the art of converting raw sewage to a sterile fertilizer, the method comprising the steps of subjecting said raw sewage to grinding while in intimate contact with a halogenated hydrocarbon solvent to form a sludge and effluent, gravitationally separating the sludge from the effluent, sterilizing the effluent, settling from the sludge heavy inorganic material, dehydrating the sludge by heating it while in contact with the halogenated hydrocarbon solvent, vaporizing the solvent, and recovering the dehydrated and decontaminated sludge in the form of a sterile solid.

7. In the art of converting raw sewage to a sterile fertilizer, the method comprising the steps of grinding said raw sewage while in intimate contact with a halogenated hydrocarbon solvent to form a sludge and effluent, said solvent being present in an amount exceeding the water content of said sewage, gravitationally separating the sludge from the effluent, sterilizing the effluent, settling from the sludge heavy inorganic materials, dehydrating the sludge by heating it while in contact with the halogenated hydrocarbon solvent, vaporizing the solvent, and recovering the dehydrated and decontaminated sludge in the form of a sterile solid.

8. The method of claim 1 wherein there is maintained an excess of solvent over water present in the sludge.

9. The method of claim 6 wherein the effluent is sterilized by passing it countercurrently with a hot solvent to raise the temperature of the effluent above about 190° F. and subsequently countercurrently flowing the hot effluent with cool solvent.

10. The method of claim 6 wherein the effluent is sterilized by passing it countercurrently with a hot solvent to raise the temperature of the effluent above about 190° F. and subsequently countercurrently flowing the hot effluent with cool solvent, and wherein the solvent is circulated in a closed system.

11. The method of claim 6 wherein the effluent is sterilized by passing it countercurrently with a hot solvent to raise the temperature of the effluent above about 190° F. and subsequently countercurrently flowing the hot effluent with cool solvent, and wherein the solvent is circulated in a closed system, and wherein the said sterile effluent is passed through a vacuum chamber to separate any entrained solvent therefrom.

12. In the art of sewage disposal, the method comprising, comminuting the sewage, intimately mixing the comminuted solids and entrained effluent with a halogenated hydrocarbon solvent to form a sludge, stratifying the sludge-effluent mixture to float a sludge-effluent stratum on a stratum of solvent-enveloped heavy inorganic matter, separating the respective strata, centrifuging the sludge-effluent stratum to separate a substantial proportion of the entrained effluent therefrom, and heating the residue to recover a substantial part of the solvent therefrom.

13. The method of claim 12 wherein the sewage is comminuted and settled before the settlings are mixed with the solvent.

14. The method of claim 13 wherein the residue from the centrifuge is heated to vaporize the solvent without dehydration.

References Cited

UNITED STATES PATENTS

| 1,996,353 | 4/1935 | Seydel | 210—62 |
| 2,309,062 | 1/1943 | Graham | 210—62 |
| 2,755,293 | 7/1956 | McDonald | 210—10 X |

DONALL H. SYLVESTER, *Primary Examiner.*

R. BAJEFSKY, *Assistant Examiner.*